United States Patent [19]

Perez

[11] 4,187,065

[45] Feb. 5, 1980

[54] BLOW MOLDING MACHINE

[75] Inventor: Julio C. Perez, Saline, Mich.

[73] Assignee: Roman Machine Co., Milan, Mich.

[21] Appl. No.: 890,623

[22] Filed: Mar. 20, 1978

[51] Int. Cl.² .................................................. B29C 17/07
[52] U.S. Cl. ..................... 425/136; 264/40.1;
264/542; 425/140; 425/150; 425/151; 425/155;
425/163; 425/532
[58] Field of Search ................... 264/40.1, 40.2, 40.3,
264/98, 99, 540–543; 425/136, 140, 145, 151,
156, 161, 163, 155, 532, 150

[56] References Cited

U.S. PATENT DOCUMENTS

| 3,217,357 | 11/1965 | Martin, Jr. | 425/151 X |
|---|---|---|---|
| 3,239,879 | 3/1966 | Resnick | 264/99 X |
| 3,242,533 | 3/1966 | Wintriss | 425/155 X |
| 3,635,622 | 1/1972 | Wechsler | 425/151 X |
| 3,759,648 | 9/1973 | Hunkar | 425/140 |
| 4,094,620 | 6/1978 | Daubenbuschel et al. | 425/140 |

*Primary Examiner*—Jan H. Silbaugh
*Attorney, Agent, or Firm*—Harness, Dickey & Pierce

[57] ABSTRACT

Means for controlling the action of a blow molding machine of the type having a continuously extruding parison. The control means includes a photocell signal circuit responsive to extrusion of each parison at normal speed to initiate the decompression of a product at the blow molding station and opening and transfer of the mold halves back to the parison station. Should material in the extruder become depleted, the slower parison extrusion time will be detected and initiate signals for an alarm and deactivation of the blow molding machine. Means are also provided for disenabling this alarm and deactivation system if it is desired to "dry cycle" the machine for test purposes without running the extruder.

8 Claims, 3 Drawing Figures

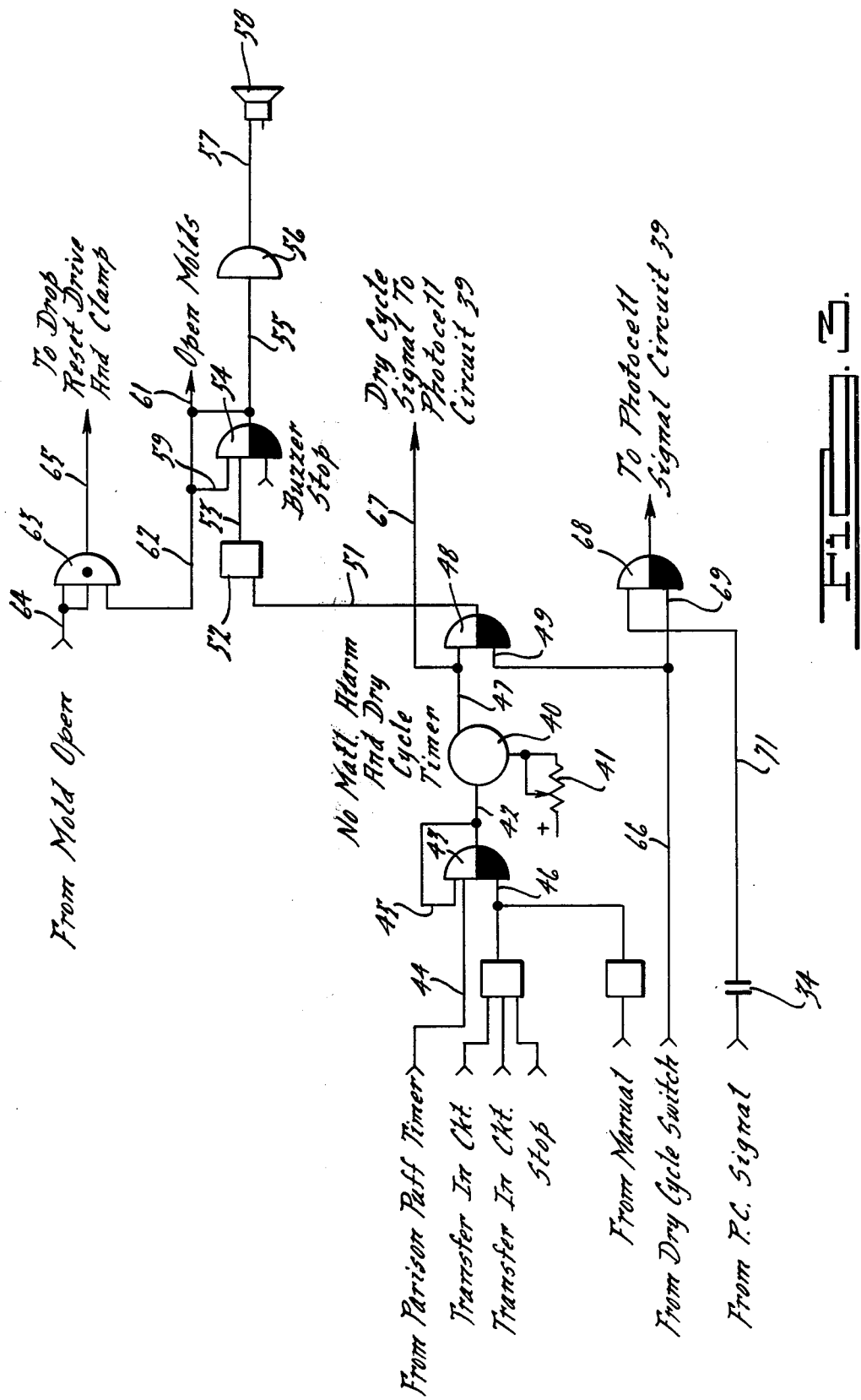

BLOW MOLDING MACHINE

BACKGROUND OF THE INVENTION

1. Field of the Invention

The invention relates to blow molding machines of the type having a continuously extruded parison at one station and one or more pairs of mold halves which periodically transfer an extruded parison to a blow molding station where it is acted upon by a blow pin. The invention is particularly concerned with the control means for such blow molding machines which will be activated in the event of depletion of plastic material in the extruder, or if it is desired to "dry cycle" the machine for observation, test or adjustment purposes.

2. Description of the Prior Art

It is known to have sensing means such as an infrared detector at the parison station at such machines which will signal the arrival of the bottom of each descending parison at a predetermined location in order to exhaust a product at the blow molding station, after which the mold halves will open and be transferred back to the parison station to pick up the next parison. Huncar Laboratories, Inc. of Cincinnati, Ohio has a system where a photocell detects the descent of a parison and matches its speed against a timer, slowing down or speeding up the extruder depending upon the parison speed. However, in previously known systems, if the extruder ran out of material or was shut off, the machine would continue to run, which could cause waste and possibly damage or injury.

BRIEF SUMMARY OF THE INVENTION

It is an object of the present invention to overcome the above described disadvantages of previous systems and provide a blow molding machine in which damage or injury will be prevented in the event of depletion of material in the extruder.

It is another object to prevent a novel and improved system of this character in which the machine can be "dry cycled" at will for purposes of observation or adjustment without fear of inadvertent actuation of the alarm or shut down mechanisms.

Briefly, the invention comprises, in a blow molding machine of the type having a continuous parison station extruder, a blow molding station, mold halves movable between said parison and blow molding stations, parison sensing means actuated in response to descent of a parison to a predetermined point to decompress a product at the blow molding station, open the mold halves and transfer the mold halves back to the parison station, and means for detaching said parison, the improvement comprising a timer, means responsive to completion of a parison for starting said timer, means responsive to running out of said timer before actuation of said parison sensing means by the next parison for disenabling said blow molding machine, and means responsive to actuation of said parison sensing means by the next parison before said timer has run out for the resetting and stopping said timer.

BRIEF DESCRIPTION OF THE DRAWINGS

FIG. 3 is a circuit diagram showing the electrical components of the invention.

DESCRIPTION OF THE PREFERRED EMBODIMENT

Figure 1:
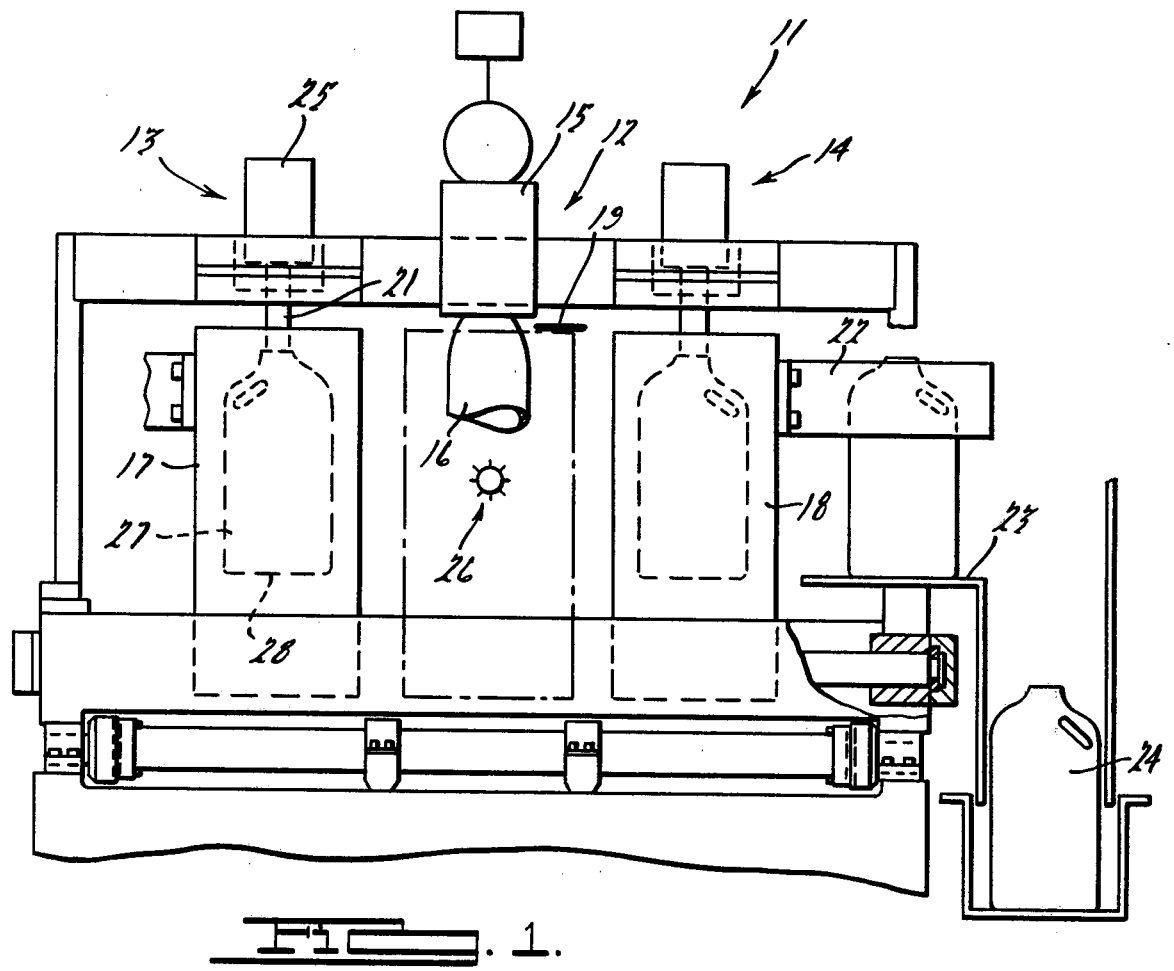
FIG. 1 is a partially schematic front elevational view of a blow molding machine having a parison station and two blow molding stations on opposite sides thereof, with the photocell of this invention shown in position.

The blow molding machine is generally indicated at 11 and comprises a parison station generally indicated at 12 and two blow molding stations on opposite sides thereof and indicated generally at 13 and 14. A blow molding machine of this general type is shown and described in co-pending patent application Ser. Nos. 890,626 and 890,625, both filed Mar. 20, 1978, respectively by Merritt W. Martin and assigned to the assignee of the present invention. The parison station has an extruder 15 which continuously extrudes a tubular parison 16 of plastic material. Two pairs of mold halves 17 and 18 are provided, each pair of mold halves being movable between the parison station and one of the other of the two blow molding stations. After a parison has been fully extruded, a pair of mold halves will close around it at station 12, after which a knife 19 will sever the parison and the mold halves will carry it to a blow molding station 13 or 14 at which a blow pin 21 is present. The blow pin will descend and force compressed air into the parison to form the product. Meanwhile, the other pair of mold halves will be returning from their blow molding station to the parison station to pick up the next parison. After the product is formed at each blow molding station, its mold halves will open and be transferred back to the parison station. Each pair of mold halves is shown as carrying a pair of flash removal and product transfer members 22 outwardly thereof. As each pair of mold halves returns to the parison station these members 22 will be brought to the product at the blow molding station which is hanging on the mold pin, and close around it as their corresponding mold halves close around the next parison. The flash will be removed, and when the mold halves return with the next parison to the blow molding station the members 22 will carry the completed product (the blow pin having been retracted) to a platform 23, a previous product on the platform being moved to a conveyor area 24. Other features of this machine, such as the double acting fluid motors 25 for the blow pins and the means for lowering the mold halves temporarily as they leave the parison station to prevent sticking of the next parison, are not described in detail, because they do not in themselves form part of the present invention, although they are described in the aforementioned copending applications.

Figure 2:
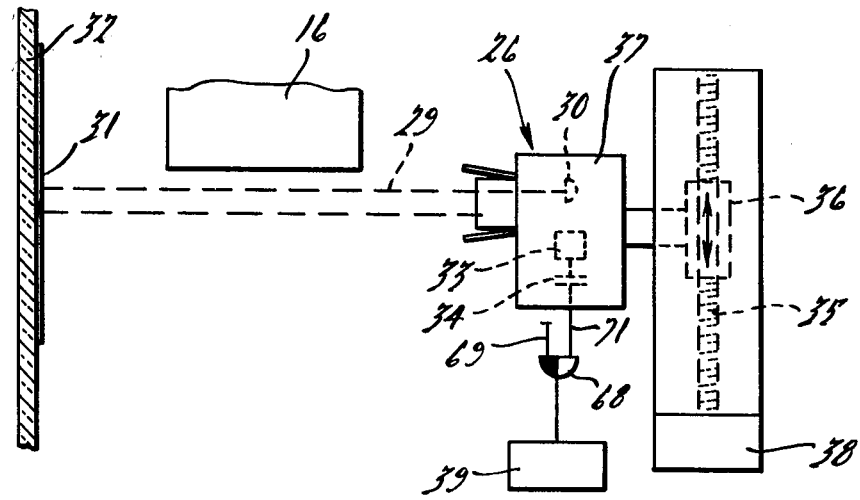
FIG. 2 is a partially schematic side elevational view of this machine showing the light source, photocell and reflecting tape as well as the components connected to the parison sensing switch.

Parison sensing means generally indicated at 26 is provided at the parison station. As shown in FIGS. 1 and 2, this means comprises a light source and a photoelectric cell which are mounted at an intermediate point of the parison descent. One suitable example for sensing means 26 is model No. 42RLU manufactured by Electronics Corporation of America, Cambridge, Mass., which can be modulated to emit only high frequency light in which case the detector will only respond to this frequency, thus eliminating accidental triggering by external light. As illustrated, the product 27 is a bottle which has a bottom 28 and the parison will extend to its full length somewhat below bottom 28 so as to leave a tail which is later removed. Sensing means 26 however is spaced above the level of the bottom 28. The light source will send a beam of light 29 from light source 30 to a reflecting tape 31 having a reflecting surface and an adhesive backing. This reflecting tape is vertically disposed and mounted on a safety door 32 at the front of the parison station. The safety door is swingably mounted so that when it is opened the reflecting tape will no longer reflect light beam 29 back to the photocell 33.

A switch 34 is actuated by the photocell portion 33 of the photocell assembly. The entire assembly comprising the light source, photocell and switch may be vertically adjustable by mounting it on a vertically disposed screw 35. This screw carries a nut 36 which in turn is attached to the housing 37 of sensing means 26. Screw 35 is rotatable by a remote control motor 38. Thus, the level of the sensing means can be adjusted for different products, reflecting tape 31 being operative at all levels of sensing means 26.

Means schematically indicated at 39 is provided for initiating the functions of machine 11 in response to actuation of the sensing means, that is, interruption of light beam 29 by parison 16 which for example could close switch 34. This means 39 could for example initiate decompression of product 27 and, in a machine more fully described and claimed in aforementioned application Ser. No. 890,626, temporary decompression of the top of blow pin actuating motor 25. This in turn would cause the mold halves to open and be transferred inwardly to the parison station. By means described in detail below, this will reset a timer which forms part of the present invention.

Should material in extruder 15 become depleted, it is desirable to disenable the machine and sound an alarm in order to prevent damage or injury. This means is shown in FIG. 3 and comprises a resettable timer 40. A suitable solid state timer is manufactured by Solid Controls, Inc., of Minneapolis, Minn., Model No. 2330, and is adjustable by means of a potentiometer 41. Running of the timer is triggered by a conduit 42 leading from the output of an OR circuit 43 with an input conduit 44, a relatch input conduit 45 and inhibit input conduit 46. The input to conduit 44 could come for example from a parison puff timer (not shown) which is part of a conventional means for puffing out the top of a parison 16 after the mold halves have closed around it in order to facilitate cutting of knife 19. The inhibit conduit 46 could be controlled by limit switches (not shown) responsive to transfer into the parison station of either pair of mold halves 17 or 18, and also responsive to a stop signal or a manual switch.

The output of timer 40 through conduit 47 leads to the input of an OR circuit 48 having an inhibit conduit 49, the control for which is described below. The output conduit 51 from circuit 48 leads to a gate expander 52, the output 53 of this gate expander leading to an OR circuit 54. The output conduit 55 of circuit 54 leads to an AC switch 56, the output 57 of this switch being connected to an audible alarm 58.

Output conduit 55 of circuit 54 also leads to a self-latching conduit 59 as well as a conduit 61 leading to means (not shown) opening the mold halves. A conduit 62 leads from the output of circuit 54 to an AND circuit 63. A conduit 64 also leads to this AND circuit from limit switch means (not shown) responsive to opening of the molds. An output conduit 65 from AND circuit 53 leads to means (not shown) for disenabling the blow molding machine, in particular the means for dropping the mold halves and stopping the extruder drive and the pump for actuating the mold halves.

The inhibit conduit 49 for OR circuit 48 is controlled by a conduit 66 leading from a "dry cycle" switch. This switch may be actuated when the extruder is not running and will inhibit the actuation of circuit 48. A conduit 67 is connected from time output conduit 47 to a bypass switch (not shown) for switch 34. Thus, as will be described in detail below, when it is desired to "dry cycle" the machine timer 40 will send the signal for continued operation even in the absence of a parison. A circuit 68 having an inhibit conduit 69 is also provided between the conduit 71 leading from switch 34 to control means 39. Conduit 69 is controlled by a signal from conduit 66 so that sensing means 26 will be deactivated during the "dry cycle" run.

In operation, assuming a condition in which there is adequate material in extruder 15 and the extruder is running, there will be no inhibit signal at circuits 48 or 68. Assuming further that neither pair of mold halves is at the parison station, a parison 16 will be extruded. When the bottom of this parison reaches sensing means 26, it will interrupt light beam 29 and close switch 34. This will send a signal through circuit 68 to control means 39, initiating exhaustion of compressed air at a product being formed, say at station 13. The other operations described above, namely opening of the mold halves and their return to the parison station, will follow in sequence.

During the time parison 16 is descending toward sensing means 26, timer 41 will be running. The timer will have been initiated by a signal in conduit 44 caused by running out of the parison puff timer of the previous parison. This signal will cause self-latching of circuit 43 and the running of timer 40. If parison 16 reaches sensing means 26 before timer 40 runs out, the actions described above will take place, and by the time the mold halves return to the parison station the parison will have extended to its full length. Arrival of the mold halves at the parison station will cause an inhibit signal to be sent through conduit 46 to circuit 43 to unlatch this circuit and reset the timer to zero. The timer will not be started again until a new signal from conduit 44 and the cycle will be repeated.

Should material be depleted in extruder 15 the parison 16 will be formed at a slower rate, and timer 40 will run out before the parison interrupts light beams 29. This will close circuit 48 and send a signal through gate expander 52 and circuit 54 to alarm 58, open mold conduit 61 and AND circuit 63. When the molds open the AND circuit will be completed by energization of conduit 64 resulting in a signal to conduit 65 which will disenable the blow molding machine.

Should it be desired to observe of adjust the machine in a "dry cycle" run, conduit 66 will be energized to inhibit circuits 48 and 68. This will deactivate sensing means 26 and will also prevent timer 40 from actuating the alarm and disenabling machine 11. Instead, when the timer 40 runs out it will energize conduit 67 which will bypass switch 34 and actuate means 39, thus continuing to operate the molding machine. Even though conduit 67 is energized when circuit 48 is not inhibited, the output from circuit 48 will override the "dry cycle" signal under these circumstances and result in shutdown of the machine. The dry cycle switch may be actuatable either manually or in response to stopping of extruder 15.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In a blow molding machine of the type having a continuous parison extruder station, a blow molding station, mold halves movable between said parison and blow molding stations, means for moving said mold halves, control means for said moving means parison sensing means actuatable in response to a descent of a parison to a predetermined point for actuating said control means, and means for detaching said parison, the improvement comprising a timer, means responsive to completion of a parison for starting said timer, means responsive to running out of said timer before actuation of said parison sensing means by the next parison for disenabling said blow molding machine, and means responsive to actuation of said parison sensing means by the next parison before said timer has run out for setting and stopping said timer.

2. The combination according to claim 1, said parison sensing means comprising a light source and photocell at said parison station, said sensing means being responsive to interruption of said light source by the descending parison.

3. The combination according to claim 2, further provided with means for vertically adjusting said photocell and light source, and a vertically disposed reflecting strip opposite said photocell and light source for reflecting a light beam from said light source to said photocell.

4. The combination according to claim 3, said blow molding machine being further provided with a safety door at said parison station, said reflecting tape being mounted on said safety door, whereby opening of said safety door will prevent a light beam from being reflected back to said photocell.

5. The combination according to claim 1, further provided with means responsive to running out of said timer for sounding an alarm.

6. The combination according to claim 1, said timer having an input controlled by a self-latching OR circuit with inhibit, said means responsive to parison completion comprising an input to said last mentioned circuit, and means responsive to transfer of said mold halves for imparting an inhibit input signal to said last mentioned circuit.

7. The combination according to claim 1, further provided with means responsive to stopping of said extruder for inhibiting said timer from disenabling said blow molding machine.

8. The combination according to claim 7, further provided with means responsive to running out of said timer after said last mentioned inhibiting signal has been given to bypass said parison sensing means, whereby operation of the blow molding machine will continue in a "dry cycle".

* * * * *